Dec. 23, 1941.    M. RONNING    2,266,805
COMBINE
Filed Jan. 15, 1940    3 Sheets-Sheet 1

Inventor
Martin Ronning
Carlsen & Hayle
Attorneys

Dec. 23, 1941.                M. RONNING                 2,266,805
                               COMBINE
                         Filed Jan. 15, 1940           3 Sheets-Sheet 2

Inventor
Martin Ronning
Carlsen & Hazle
Attorney

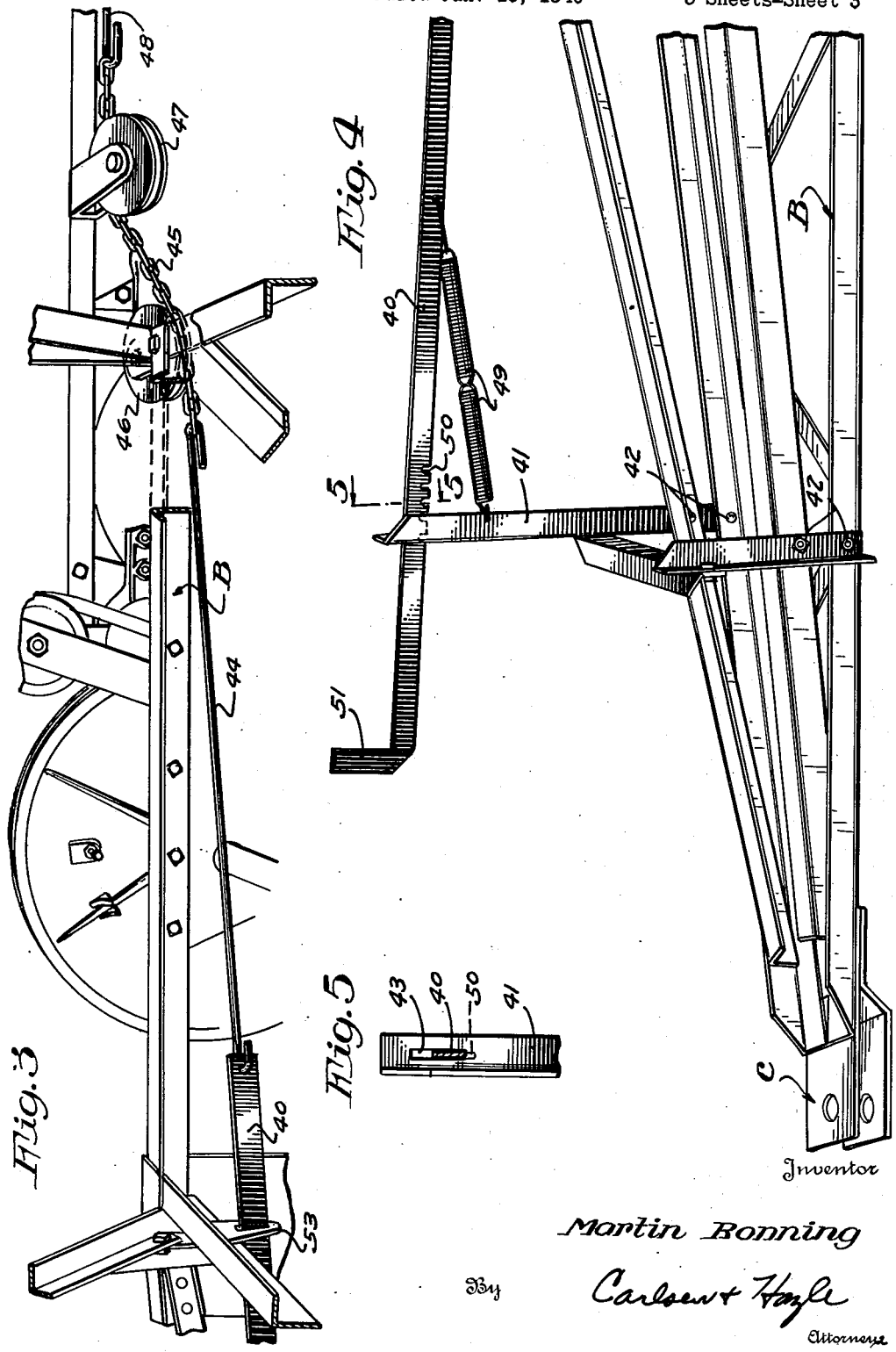

Patented Dec. 23, 1941

2,266,805

UNITED STATES PATENT OFFICE 2,266,805

COMBINE

Martin Ronning, St. Louis Park, Minn., assignor to Minneapolis-Moline Power Implement Company, Minneapolis, Minn., a corporation of Delaware Application January 15, 1940, Serial No. 313,831

5 Claims. (Cl. 130—27)

This invention relates generally to improvements in combines or to that type of machinery which both harvests and threshes grain as it travels over the field.

Such machines include harvesting mechanisms for cutting the crop and threshing and separating mechanism for beating out the grain from the head, screening the grain and delivering it to a tank or sacking apparatus and separately discharging the remaining straw, chaff, and other foreign matter. This invention has particular reference to improvements in the cleaning mechanism, or shoe as it is called, by which the grain is finally sieved out for delivery and from which is discharged broken heads containing unthreshed kernels and other tailings. These tailings are returned to the machine for recirculation therethrough and it is obvious that the amount and composition of the tailings will give an indication to the operator of the operation of the machine as a whole, and particularly of the effectiveness of the cleaning shoe.

The primary object of the invention is therefore to provide a tailings return mechanism by which the tailings are returned to the threshing parts of the machine within view of the operator to thus enable him to keep a constant check on the operation of his machine and to provide, in connection with the above, a means for adjusting the cleaning shoe from the operator's position, thus making it possible for the operator to adjust the shoe at any time as requirements therefor are indicated by quantity and condition of the tailings.

The invention further has as an object the provision of a combine suitable for pulling behind a tractor. The tailings return and cleaning shoe adjusting means are accordingly located on the combine in position to be observed and manipulated by the tractor driver in his seat.

These and other more detailed and specific objects will be disclosed in the course of the following specification, reference being had to the accompanying drawings, in which—

Fig. 3 is an enlarged fragmentary perspective view of a medial portion of the cleaning shoe adjusting means.

Fig. 4 is an enlarged perspective view of the forward end of the shoe adjusting means and hitch frame of the combine.

Fig. 5 is a cross section along the line 5—5 in Fig. 4.

Figure 1:
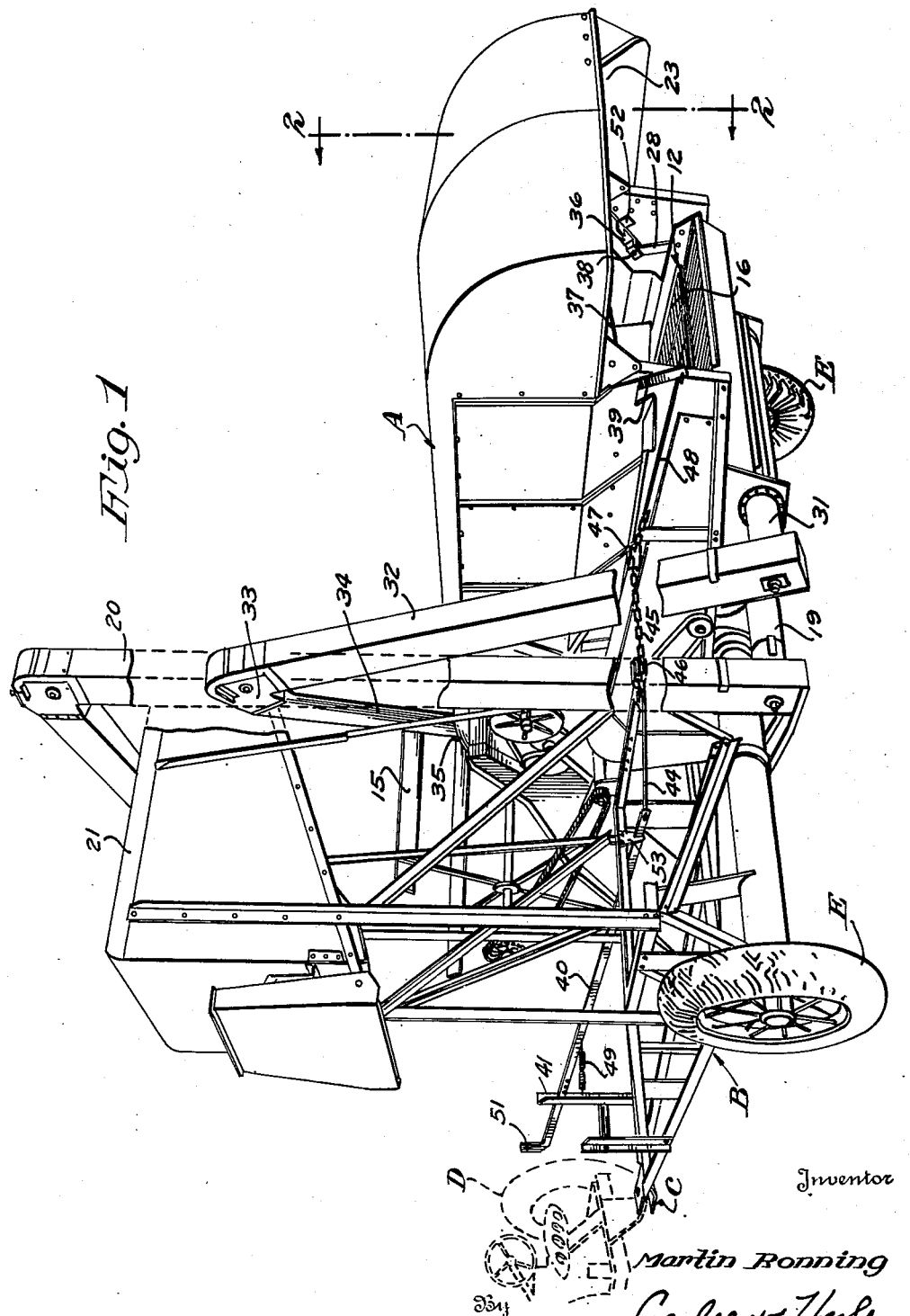
Fig. 1 is a perspective view, looking forwardly and toward the right side, of a combine embodying this invention, the pulling tractor being shown fragmentally in dotted lines.
Figure 2:
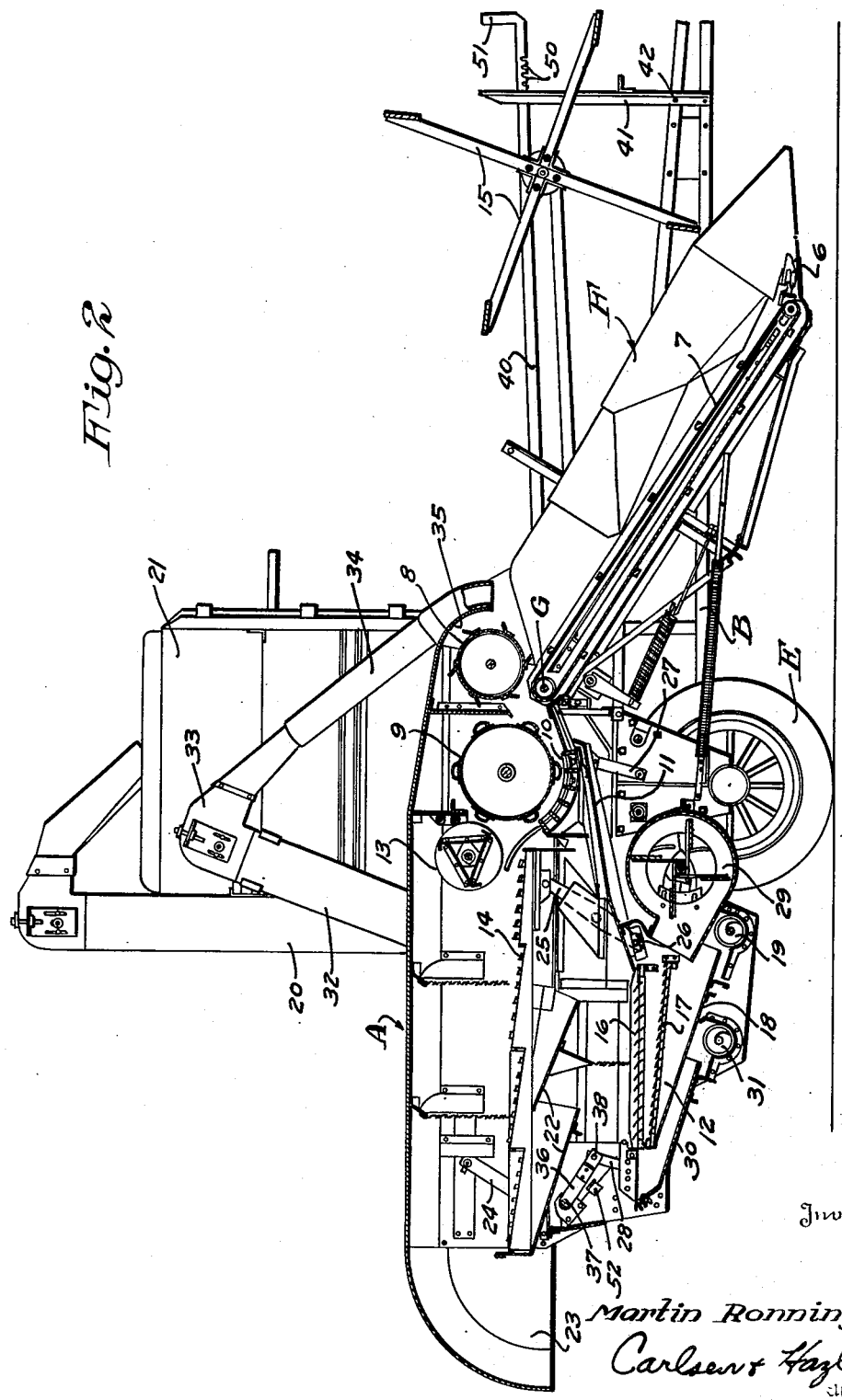
Fig. 2 is a vertical longitudinal section through the combine taken approximately along the line 2—2 in Fig. 1.

Referring more particularly to the drawings, the combine is seen to comprise a main body portion designated generally at A which is elongated longitudinally with respect to the line of travel and from the left hand, or land side of which is forwardly extended a main frame B having a hitch C at its forward extremity for connection to the tractor D. This assembly is supported by transversely spaced ground wheels E to travel over the field with the tractor, and the arrangement is obviously such that the body portion A will travel a path alongside that of the tractor.

The main elements of the combine comprise the cutter or harvester 6, at the lower forward end of the body A, the upwardly and rearwardly inclined raddle conveyor or canvas 7, the rotary grain beater 8, threshing cylinder 9, and associated concave or grate 10, constituting the threshing mechanism; grain pan 11, and the cleaning shoe 12, straw beater 13, and straw racks 14, making up the cleaning mechanism. The grain is acted upon by the reel 15 in usual manner, and is cut by the cutter 6 whereupon it falls to the conveyor 7 and is carried thereby to the cylinder 9, being first subjected to a beating action by the beater 8, to feed the grain into the cylinder and prevent the grain from bunching. The cylinder 9 has the usual rasp bars which, as the cylinder rotates, rubs the grain over the concave 10 extracting by far the greater part of the grain from the heads. This grain, with such foreign matter as broken, unthreshed heads, chaff, and green materials, falls to the grain pan 11 which leads it to the cleaning shoe 12 where it moves over the upper chaffer sieve 16 and thence through the lower cleaning sieve 17, the clean grain finally falling over the lower apron or return pan 18 of the shoe to a transverse spiral conveyor 19 carrying it out to a grain elevator 20. Said elevator 20 carries the clean grain to a grain tank 21 supported above the frame B for subsequent discharge to a wagon or into sacks.

The straw emerging from the cylinder 9 is subjected to a beating action by straw beater 13 and then falls to the transversely slotted straw racks 14 and the grain and small matter thus further separated from the straw falls directly to the grain pan 11 or upon aprons 22 which lead back forwardly to the cleaning shoe 12, the straw finally being discharged at the rear of the machine beneath the hood 23.

The straw racks 14 are given a rotary, longitudinal tossing motion both to shake the grain from the straw and to feed the straw progressively rearward and for this purpose the rear end is hung by pivotal links (one shown) 24 to the inside of the body A and the forward end is pivotally connected to rocker arms 25, only one of which is shown. The grain pan 11 and cleaning shoe 12 are pivotally connected at 26 to each other and to the lower ends of the rocker arms 25 and forwardly and rearwardly are supported by pivot links 27 and 28 to have a similar longitudinal tossing motion and facilitate the travel and separation of material thereby.

A blower fan 29 is located forwardly of the cleaning shoe 12 with its outlet directed rearwardly to blow out light chaff and such matter from the grain as it moves over and through the sieves in the shoe.

The cutter 6 and conveyor 7 are mounted and supported in a header structure designated generally at F, which may pivot about the transverse axis G to raise and lower the cutter and thus regulate the height of the cut. The reel 15 similarly may be raised and lowered to maintain best effectiveness in the various positions of the header structure.

Power for the operation of the various moving parts may be derived from the usual rearwardly located power take-off of the tractor through a conventional power take-off mechanism (not shown) or, of course, a separate engine might be mounted on the combine to supply power for its operation. In either case the various working parts are connected by suitable sprocket chains, belts, or gears to cause the proper relative operation, as will be understood.

The tailings, such as heads containing unthreshed grain and the like, rejected by the cleaning shoe 12, move off the rear end thereof and fall to a tailings apron or return pan 30 by which they are led forwardly and downwardly to a transverse, screw type tailings conveyor 31. This conveyor conducts the tailings to an elevator 32 which extends upwardly and forwardly to discharge into a hood 33 from which a spout 34 leads forwardly and downwardly and is secured to the forward, upper portion 35 of the body A immediately ahead of the grain beater 8 and over the upper delivery end portion of the conveyor canvas 7. The tailings thus are discharged onto the canvas 7 and, by the momentum thereof, are carried back into the machine for recirculation and further threshing and separation therein.

This tailings return constitutes one of the chief features of my invention. Heretofore, in all machines with which I am familiar, the tailings have been returned to the machine immediately at the front of the threshing cylinder. There is a tendency therefore for the tailings, particularly when they are heavy, to work down beneath the canvas and sometimes cause clogging but, far more important, the tailings, when thus returned, are hidden from view of the operator by intervening housing walls and the forward beater. Inasmuch as the quantity and composition of these tailings depend upon, and serve as a positive indication of, the general operation of the machine and particularly of the cleaning shoe, it is obviously of advantage if the operator can more or less constantly observe the tailings as they return to the input end of the machine. He is thus able to make such minor adjustments as may be necessary at any time and without interfering with the operation of the machine.

By my invention the tailings are discharged within clear view of the operator and additionally they are returned to the machine at a point at which they cannot possibly clog up and cause stoppage of the conveyor feeding the material to the threshing and separating mechanism.

The cleaning shoe 12 usually will operate to best effect in a horizontal position and it is therefore necessary to provide some adjustment so that the shoe may be kept substantially level even though the machine itself may tilt from the horizontal such as would occur during travel over hilly fields. For this purpose I provide hanger arms 36 within the rear of the machine which are secured in radially extending positions from a transverse rock shaft 37 and at their free ends are pivotally connected at 38 to the rear pivot links 28 supporting the shoe. The ends of the rock shaft 37 are journaled through or in the sides of the housing A and at the frame or land side thereof an operating lever 39 is rigidly secured to the end of the shaft. The foregoing assembly is such that the cleaning shoe 12 may have the desired forward and rearward tossing motion imparted by the rocker arms 25 but by a pull forwardly on the lower end of the operating lever 39 the hanger arms 36 may be raised to pull the rear end of the shoe upwardly. The shoe pivots at 26 at the forward end for this purpose, and of course by suitable forward and rearward manipulation of the operating lever 39 the shoe may be raised and lowered to assume any desired position longitudinally.

Such operation of the shoe is carried out by an elongated operating or handle bar 40 which is forwardly located and extended and slidably supported for longitudinal motion in a bracket or standard 41 secured at 42 to the forward portion of the frame B and slotted at 43 to receive the bar. A link 44 connects the rear end of the bar 40 to a chain 45 which is trained around pulleys 46 and 47 mounted in the frame, and a rear link or rod 48 finally connects the chain to the operating lever 39. Retractile coil springs 49 are stretched between the bar 40 and standard 41 and the bar itself has spaced notches 50 in its underside to selectively engage the lower margin of the slot 43. A handle 51 is formed at the forward end of the bar and is located conveniently to the rear of the tractor operator's station on the pulling tractor as clearly shown in Fig. 1.

In operation the driver or operator may reach rearwardly and slide the bar 40 either rearwardly or forwardly, first releasing it by raising it to clear the notches 50 from the slot and of course returning it to such locked position after each adjustment. A forward pull on the handle 51 will act to swing the operating lever 39 forwardly and raise the rear end of the cleaning shoe, as will be evident, and in which operation the pull of the springs 49 aid in overcoming the resistance offered by the weight of the shoe. A rearward movement of the handle will lower the rear end of the shoe, in which case its weight aids in the operation.

Stops 52 secured within the housing A in the path of the hanger arms 36 limit the downward movement of the rear end of the cleaning shoe, as will be evident. The rear portion of the bar 40 is slidably supported in a slotted bracket 53 secured to the frame B in order to maintain proper alignment.

By the foregoing adjustment of the cleaning shoe the operator, aside from keeping the shoe properly level in accordance with ground irregularities without leaving his seat on the tractor, may also, in accordance with the appearance and quantity of the tailings discharged at spout 34, make such adjustments as may be necessary in order to maintain best effectiveness in the cleaning operation. As an example in a field having patches of green weeds, the operator, observing these weeds as they appear in the tailings, may lower the rear end of the shoe to allow the mass of weeds to move off of the shoe more readily and fall to the ground, without entering the tailings or otherwise interfering with the operation. There are of course numerous other circumstances in which adjustment should be made, and they may be readily carried out in my machine as will be apparent.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A combine adapted to be pulled behind a tractor and comprising, a body, grain threshing and cleaning mechanism in the body, the said cleaning mechanism including a shoe for screening out tailings from the grain, means supporting the shoe for longitudinal tilting adjustments, means for returning a part of such tailings to the threshing mechanism for further threshing operations thereby, the said tailings return means including a forwardly located outlet disposed exteriorly of the body for discharging the tailings within view of the operator of the tractor, and means located forwardly for control by the tractor operator for adjusting the cleaning shoe in accordance with the observed condition of the tailings returned to the threshing mechanism.

2. A combine adapted to be drawn behind a tractor and comprising a body, a grain harvester and conveyor at the forward part of the body, a grain threshing mechanism for threshing grain received from the conveyor, a cleaning shoe for receiving threshed grain from the threshing mechanism and screening out tailings therefrom, means for conducting at least a part of said tailings from the cleaning shoe forwardly to the conveyor and discharging the tailings exteriorly of the body and in view of the operator of the tractor, the said cleaning shoe being mounted for longitudinal tilting adjustments to vary the amount of tailings returned to the conveyor, and means at the forward end of the combine within convenient reach of the operator of the tractor for adjusting the cleaning shoe.

3. In a combine for attachment behind a tractor, wheeled frame and a body thereon, a grain cleaning shoe in the body, means pivotally supporting a forward end of the shoe and operative to oscillate the shoe for grain cleaning purposes, a rock shaft in the body above the shoe, hanger arms carried in the rock shaft for upward and downward swinging movements, links pivotally connected between the hanger arms and a rear end of the shoe, a handle bar forwardly disposed on the frame for manipulation by the tractor operator, a standard member on the frame slidably supporting the handle bar for fore and aft movement, the said bar having notches for selective engagement with the standard member to lock the bar in an adjusted position, an operating lever on the rock shaft, and means connecting the handle bar and operating lever for raising and lowering the hanger arms and rear end of the shoe.

4. In a combine for attachment behind a tractor, wheeled frame and a body thereon, a grain cleaning shoe in the body, means pivotally supporting a forward end of the shoe and operative to oscillate the shoe for grain cleaning purposes, a rock shaft in the body above the shoe, hanger arms carried on the rock shaft for upward and downward swinging movements, links pivotally connected between the hanger arms and a rear end of the shoe, a handle bar forwardly disposed on the frame for manipulation by the tractor operator, a standard member on the frame slidably supporting the handle bar for fore and aft movement, the said bar having notches for selective engagement with the standard member to lock the bar in an adjusted position, an operating lever on the rock shaft, a link rod connected to the operating lever, a second link rod connected to the handle bar and a flexible member connecting the said link rods whereby the shoe may be raised and lowered at its rear end by forward and rearward movement of the said handle bar.

5. A combine adapted to be drawn behind a tractor and including grain threshing and cleaning mechanism, the said cleaning mechanism including a shoe mounted for longitudinal tilting adjustments and adapted for screening out varying quantities of tailings from the grain in accordance with the inclination given the shoe by such adjustments, means for returning a part of such tailings to the threshing mechanism for further threshing operations thereby, the said tailings return means having an outlet forwardly located to discharge the tailings into the threshing mechanism within view of the operator of the tractor and means located forwardly for control by the tractor operator for adjusting the cleaning shoe in accordance with the condition and quantity of the tailings observed as they flow from said outlet.

MARTIN RONNING.